United States Patent [19]

Reeves

[11] Patent Number: 4,604,010
[45] Date of Patent: Aug. 5, 1986

[54] DRAW BAR TYPE FLANGE MOUNTED TOOL HOLDER

[75] Inventor: Derek G. Reeves, LaSalle, Canada

[73] Assignee: VSI Corporation, Pasadena, Calif.

[21] Appl. No.: 634,531

[22] Filed: Jul. 26, 1984

[51] Int. Cl.[4] .......................... B23B 31/02; B23Q 3/12
[52] U.S. Cl. .................................................... 409/233
[58] Field of Search ............... 409/233, 231, 232, 239; 408/231, 233, 239 A; 279/1 A, 1 TS, 8

[56] References Cited

U.S. PATENT DOCUMENTS

| | | | |
|---|---|---|---|
| 2,084,801 | 6/1937 | Hall | 409/233 |
| 2,361,324 | 10/1944 | Severson | 409/233 |
| 2,924,152 | 2/1960 | Zettler | 409/233 |
| 2,994,250 | 8/1961 | Walter et al. | 409/233 |
| 3,138,997 | 6/1964 | Bruckner | 409/233 |

FOREIGN PATENT DOCUMENTS 403514  3/1974  U.S.S.R. ............... 279/1 TS

Primary Examiner—Jimmy C. Peters
Attorney, Agent, or Firm—Gerald E. McGlynn, Jr.

[57] ABSTRACT

A tool holder for use with a mounting system including a spindle having a central frusto-conical bore and a draw bolt positioned centrally in the upper end of the spindle bore. The tool holder includes a central cylindrical main body portion having an annular groove in its upper end; a lower portion extending downwardly from the main body portion and including attachment means for receipt of a suitable tool; and a reduced diameter conical neck portion extending upwardly from the upper end of the main body portion, concentrically within the annular groove, sized to pilot upwardly into the conical bore of the spindle and having a threaded central bore at its upper end threadingly coacting with the lower end of the draw bolt to pull the holder into the spindle. The base diameter of the conical neck portion exceeds the base diameter of the conical spindle bore so that, as the pilot portion of the spindle seats in the annular groove in the holder, an annular space remains between the conical surface on the tool holder neck portion and the conical bore of the spindle.

2 Claims, 4 Drawing Figures

DRAW BAR TYPE FLANGE MOUNTED TOOL HOLDER

BACKGROUND OF THE INVENTION

This invention relates to tool holders including chucks, tool adapters and extensions.

Tool holders are in common use in the milling and related machining industries as a means of facilitating attachment of a tool, such as a milling cutter, to a machine, such as a milling machine. Prior art tool holders have been secured to the spindle of the milling or other machine primarily by one of two mounting arrangements. In one mounting arrangement, commonly referred to as a flange mount, the holder is secured to the spindle by a plurality of circumferentially spaced screws passing upwardly through holes in an upper flange of the holder for threaded receipt in tapped bores in the spindle. This arrangement provides a firm, precisely aligned attachment of the holder to the spindle but is subject to fouling of the spindle threads and requires an inordinate amount of time to perform the frequent tool changes that are required in the milling business. In the other mounting arrangement, commonly referred to as a taper mount, the holder includes a frusto-conical upper extension or neck which is pulled upwardly into firm seating engagement with a mating frusto-conical cavity in the spindle by a draw bolt threadably coacting with a threaded central bore in the upper conical extension of the holder. This arrangement provides quick changing of tools but is subject to misalignment or tipping of the tool holder and may require shimming to provide a precisely aligned mount.

SUMMARY OF THE INVENTION

It is the object of the present invention to provide a mounting arrangement for a tool holder that provides precise holder alignment and allows quick tool changes.

The tool holder of the invention is intended for use with a mounting system including a spindle having a central axis bore and a draw bolt positioned centrally in the upper end of the spindle bore. The invention tool holder includes a central main body portion having an annular recess in its upper end for seating coaction with a pilot portion on the lower end of the spindle; a lower portion extending downwardly from the main body portion and including attachment means for receipt of a suitable tool; and a reduced diameter neck portion extending upwardly from the upper end of the main body portion, concentrically within the annular recess, sized to pilot upwardly into the central bore of the spindle and having a threaded central bore opening at the upper end of the neck portion for threading coaction with the lower end of the draw bolt to draw the holder upwardly into the spindle until the pilot portion of the spindle seats in the annular recess in the upper end of the main body portion to firmly and precisely mount the tool holder in the spindle.

According to a further feature of the invention, the annular recess in the upper end of the main body portion is in the form of an annular groove having its inner radius defined by the base of the neck portion and its outer radius defined by a generally axially extending annular shoulder surface concentric with the axis of the holder, and the lower end of the spindle is drawn snugly into the annular groove by the threading coaction of the draw bolt with the threaded neck portion.

In the disclosed embodiment of the invention, the neck portion is frusto-conical and pilots into a frusto-conical lower portion of the central bore of the spindle, and the diameter of the neck portion at its base it is less than the diameter of the frusto-conical portion of the spindle bore at the lower face of the spindle so that, with the pilot portion of the spindle seated in the annular groove in the upper end of the main body portion of the holder, an annular space remains between the confronting frusto-conical surfaces on the tool holder neck portion and on the spindle.

DETAILED DESCRIPTION OF THE PREFERRED EMBODIMENT

Figure 1:
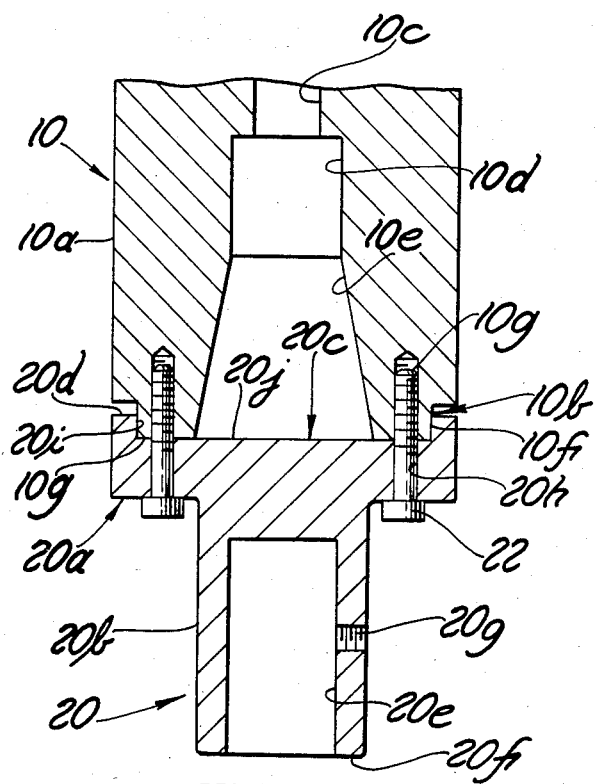
FIGS. 1 and 2 are cross-sectional views of prior art tool holder mounting arrangements.
Figure 2:
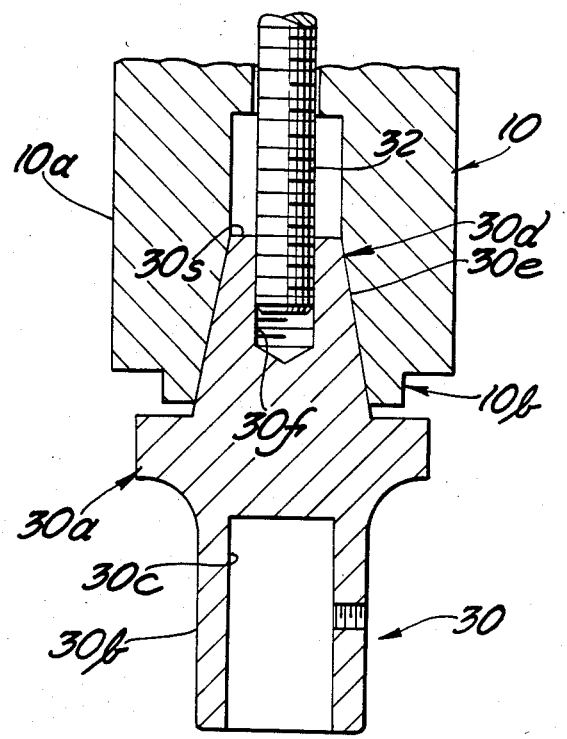

The prior art flange mount arrangement for a tool holder is seen in FIG. 1 and the prior art taper mount arrangement is seen in FIG. 2.

In each case, the tool holder is seen in conjunction with a conventional spindle 10 having a cylindrical main body portion 10a, an annular nose or pilot portion 10b, and a central bore 10c having a cylindrical counterbore 10d and a frusto-conical counterbore 10e opening at the lower face of the spindle.

In the prior art flange mount arrangement seen in FIG. 1, the tool holder 20 includes an upper cylindrical flange portion 20a, a lower cylindrical portion 20b, a central cylindrical recess 20c formed in the upper face 20d of the tool holder, and a central cylindrical bore 20e opening in the lower face 20f of the tool holder for receipt of a suitable tool (not shown) held in place by a set screw (not shown) received in a radial tapped bore 20g. Tool holder 20 is secured to spindle 10 by a series of circumferentially spaced bolts or screws 22 passing upwardly through a series of circumferentially spaced axially extending mounting holes 20h in flange portion 20a for threaded engagement with tapped axial bores 10g in spindle pilot portion 10b. When mounted, spindle pilot portion 10b fits snugly in holder recess 20c with spindle annular shoulder surface 10f fitted tightly against tool holder annular shoulder surface 20i and the annular lower face 10h of spindle pilot portion 10b seating firmly on the bottom face 20j of recess 20c.

In the prior art taper mount arrangement seen in FIG. 2, the tool holder 30 includes a central main body cylindrical portion 30a, a lower cylindrical portion 30b extending downwardly from central portion 30a and having a central axial bore 30c for receipt of a suitable tool, and a reduced diameter conicaL neck portion 30d extending centrally upwardly from central portion 30a and having a frusto-conical external surface 30e and a central tapped axial bore 30f opening in the upper face 30g of the neck portion. A powered draw bolt 32 is positioned within spindle bore 10c and threadably coacts at its lower end with bore 30f to move holder 30 up or down relative to the spindle in response to rotation of the draw bolt. The base of neck portion 30d has a greater diameter than the lower maximum diameter of spindle conical bore 10e so that, as a tool holder is piloted upwardly into the spindle by threaded coaction between draw bolt 32 and threaded bore 30f, frusto-conical surfaces 10e and 30e move into firm seating engagement prior to engagement of the lower annular face 10h of spindle pilot portion 10b with the confronting annular upper surface 30g of central main body portion 30a so that surfaces 10h and 30g do not interfere with the mating engagement of surfaces 10e and 30e. Suitable coacting keys and keyways (not shown) on the spindle and tool holder preclude rotation of the mounted tool holder relative to the spindle.

Figure 3:
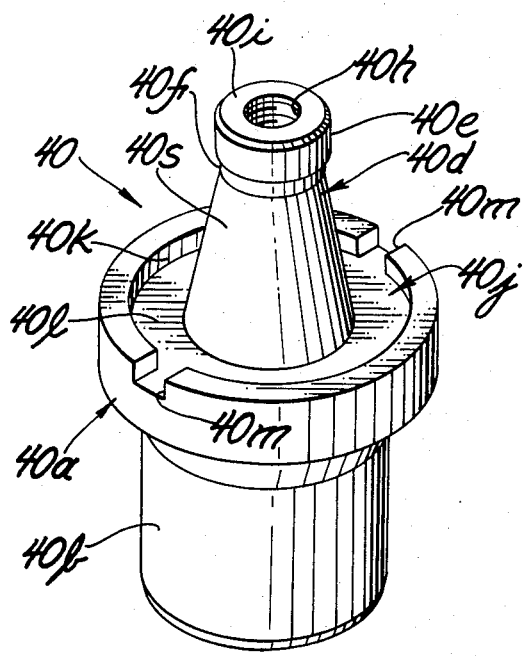
FIG. 3 is a perspective view of the invention tool holder.
Figure 4:
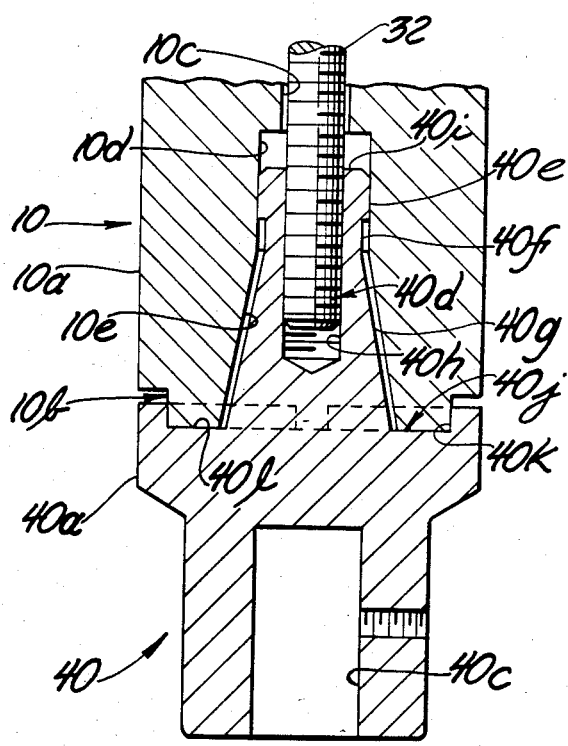
FIG. 4 is a cross-sectional view of the invention tool holder shown in conjunction with a conventional spindle.

The invention tool holder, seen at 40 at FIGS. 3 and 4, includes a central cylindrical main body portion 40a, a cylindrical lower portion 40b extending centrally downwardly from main body portion 40a and including a central bore 40c for receipt of a suitable tool, and a reduced diameter conical neck portion 40a extending centrally upwardly from the upper end of main body portion 40a.

Neck portion 40d includes a cylindrical head portion 40e, a reduced diameter cylindrical surface 40f beneath head 40e, a frusto-conical external surface 40g, and a central tapped axial bore 40h opening in the upper face 40i of neck portion 40d. An annular recess or groove 40j is formed in the upper face of main body portion 40a concentric with the central axis of the holder. The inner radius of groove 40j is defined by the base of neck portion 40d, the outer radius of groove 40j is defined by an axially extending annular shoulder surface 40k, and the bottom of groove 40i is defined by horizontally extending annular seating surface 40l.

In use, tool holder 40 is threadably engaged by draw bolt 32 to pull the holder upwardly into the central bore of the spindle. As the holder 40 moves upwardly into the spindle, head portion 40e pilots into spindle cylindrical counterbore 10d and spindle pilot portion 10b seats snugly in holder annular groove 40j with spindle shoulder surface 10f fitted tightly against holder shoulder surface 40k and spindle pilot portion annular lower face 10h seating firmly on groove bottom surface 40l. The base or maximum diameter of frusto-conical surface 40g is less than the lower, maximum diameter of spindle conical bore 10e so that conical surfaces 40g, 10e do not matingly engage but, rather, neck portion 40d serves as a rough pilot to guide the holder into the spindle to achieve final positive seating engagement of spindle pilot portion 10b in holder annular groove 40j. Keyways 40m coact with keys (not shown) on the spindle to preclude rotation of the mounted holder relative to the spindle. The holder has thus been firmly mounted to the spindle by a single, positive draw bolt powered upward movement. Removal of the holder for replacement by a different holder to accomplish a different work operation is similarily simply achieved by reverse rotation of the draw bolt to push the holder quickly and positively downwardly out of engagement with the spindle.

As compared to the prior art flange mount arrangement, the invention mounting arrangement is significantly quicker since all fastener members are eliminated. And as compared to the prior art taper mount arrangement, the invention mounting arrangement provides a more positive, precisely aligned mount. The invention mounting arrangement thus combines the quick tool changing feature of the taper mount with the positive, precise alignment feature of the flange mount.

Whereas a preferred embodiment of the invention has been illustrated and described in detail it will be apparent that various changes maybe made in the preferred embodiment without departing from the scope or spirit of the invention.

For example, although the invention tool holder has been illustrated and described as having an integral, one piece construction, it will be apparent that the tool holder may be formed from two or more separate pieces suitably rigidly joined together.

The embodiments of the invention in which an exclusive property or privilege is claimed are defined as follows:

1. A tool holder for use with a mounting system including a spindle having a central axial bore and a draw bolt positioned centrally in the upper end of the spindle bore, said holder comprising:
   A. a central main body portion;
   B. a lower portion extending fixedly downwardly from said central main body portion and including attachment means for central coaxial receipt of the shank of a suitable tool;
   C. means defining an annular recess in the upper end of said main body portion for seating coaction with a pilot portion on the lower end of the spindle;
   D. a reduced diameter neck portion extending fixedly upwardly from said upper end of said central portion, concentrically within said annular recess, sized to pilot upwardly into the central bore of the spindle and having a threaded central bore opening at the upper end of said neck portion for threading coaction with the lower end of the draw bolt;
   E. said reduced diameter neck portion being frusto-conical and tapering inwardly toward the upper end thereof;
   F. said tool holder being for use with a spindle whose central axial bore includes a lower frusto-conical portion tapering outwardly toward an opening in the lower face of the spindle and having a taper approximating that of said neck portion of said tool holder and the diameter of said neck portion at its base being less than the diameter of the frusto-conical lower portion of the spindle bore at the lower face of the spindle, whereby, with the pilot portion of the spindle seated in said recess in said upper end of said central main body portion, an annular space remains between the confronting frusto-conical surfaces on the tool holder neck portion and on the spindle;
   G. said annular recess comprising an annular groove in said upper end of said central main body portion having its inner radius defined by the base of said neck portion and its outer radius defined by a generally axially extending annular shoulder surface concentric with said axis; and
   H. the central axial bore of the spindle further including an upper cylindrical portion having a diameter approximating the diameter of the upper end of the lower frusto-conical portion of the spindle central bore and said reduced diameter neck portion including a cylindrical head portion at the upper end thereof sized to pilot upwardly into the cylindrical portion of the central axial bore of the spindle.

2. A tool holder and spindle combination comprising:
   A. a spindle including:
      1. a main body portion having a central bore including an upper portion sized to receive a draw bolt and a lower frusto-conical portion tapering outwardly toward the lower end of the spindle and opening in the lower face of the spindle, and 2. an annular pilot porton at the lower end of the spindle concentric with said central bore;
B. a tool holder including:
 1. a central main body portion,
 2. a lower portion extending fixedly downwardly from said body portion and including attachment means for central coaxial receipt of the shank of a suitable tool,
 3. means defining an annular recess in the upper end of said main body portion sized to seatingly receive said annular pilot portion of said spindle, and
 4. a reduced diameter conical neck portion extending fixedly upwardly from said upper end of said holder main body portion, concentrically within said annular recess, having an upwardly inwardly tapering configuration matching the taper of said frusto-conical portion of said central bore of said spindle but having a diameter at its base less than the diameter of said frusto-conical bore portion at its opening in the lower face of said spindle so that, as said neck portion pilots upwardly into said bore, said spindle pilot portion bottoms in said annular recess before the conical surfaces of said neck portion and bore matingly engage;
C. said annular recess comprising an annular groove in said upper end of said holder main body portion having its inner radius defined by the base of said neck portion and its outer radius defined by a generally axially extending annular shoulder surface concentric with said axis;
D. said central bore of said spindle including a cylindrical middle bore portion having a diameter greater than the diameter of said upper bore portion and approximating the diameter of the upper end of said lower frusto-conical bore portion; and
E. said reduced diameter neck portion including a cylindrical head portion at the upper end thereof sized to pilot upwardly into said cylindrical middle bore portion of said spindle.

* * * * *